United States Patent [19]

Vinet et al.

[11] Patent Number: 4,789,508

[45] Date of Patent: Dec. 6, 1988

[54] MIXTURES COMPRISING A NEMATIC LIQUID CRYSTAL AND A NON-MESOMORPHIC COMPOUND

[75] Inventors: Francoise Vinet; Claude Vauchier, both of Grenoble, France

[73] Assignee: Commissariat a l'Energie Atomique, Paris, France

[21] Appl. No.: 911,080

[22] Filed: Sep. 24, 1986

[30] Foreign Application Priority Data

Oct. 2, 1985 [FR] France ............................ 85 14622

[51] Int. Cl.[4] ..................... C09K 19/54; C09K 19/32; C09K 19/30; G02F 1/13
[52] U.S. Cl. ............................ 252/299.5; 252/299.62; 252/299.63; 350/350 R; 350/347 E
[58] Field of Search ........... 252/299.5, 299.63, 299.62; 350/350 R, 347 E

[56] References Cited

U.S. PATENT DOCUMENTS

| 4,180,475 | 12/1979 | Schadt et al. | 252/299.5 |
| 4,643,841 | 2/1987 | Ishii et al. | 252/299.61 |
| 4,695,131 | 9/1987 | Balkwill et al. | 350/350 R |
| 4,702,562 | 10/1987 | Scheuble et al. | 252/299.5 |
| 4,733,949 | 3/1988 | Abe et al. | 252/299.5 |

FOREIGN PATENT DOCUMENTS

| 0072204 | 2/1983 | European Pat. Off. | |
| 0117631 | 9/1984 | European Pat. Off. | |
| 69387 | 11/1984 | European Pat. Off. | 252/299.5 |
| 149209 | 7/1985 | European Pat. Off. | 252/299.62 |
| 206680 | 12/1986 | European Pat. Off. | 252/299.66 |
| 2094311 | 9/1982 | United Kingdom | |
| 2134110 | 8/1984 | United Kingdom | |

OTHER PUBLICATIONS

Gauthier et al., Mol. Cryst. Liq. Cryst. Letters, vol. 3(5), pp. 139–145 (1986).

Primary Examiner—Teddy S. Gron
Assistant Examiner—J. E. Thomas
Attorney, Agent, or Firm—Pearne, Gordon, McCoy & Granger

[57] ABSTRACT

The invention relates to a mixture comprising a nematic liquid crystal and a non-mesomorphous compound. The non-mesomorphous compound makes it possible to improve the elastic behavior of the nematic liquid crystal by increasing the value of the ratio $K_{33}/K_{11}$, in which $K_{33}$ represents the elastic bending constant and $K_{11}$ the elastic fanning constant of the liquid crystal. The non-mesomorphous compound can be in accordance with the formula:

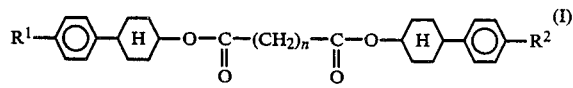

in which $R^1$ and $R^2$, which can be the same or different, represent a hydrogen atom or an alkyl radical having 1 to 12 carbon atoms and n is an integer between 2 and 16 and can be associated with liquid crystals or liquid crystal mixtures containing a 1-(alkylcyclohexyl)-2-(alkyl-fluorobiphenylyl)-ethane. These mixtures can be used as a liquid crystal in a display device.

6 Claims, 1 Drawing Sheet

U.S. Patent        Dec. 6, 1988        4,789,508
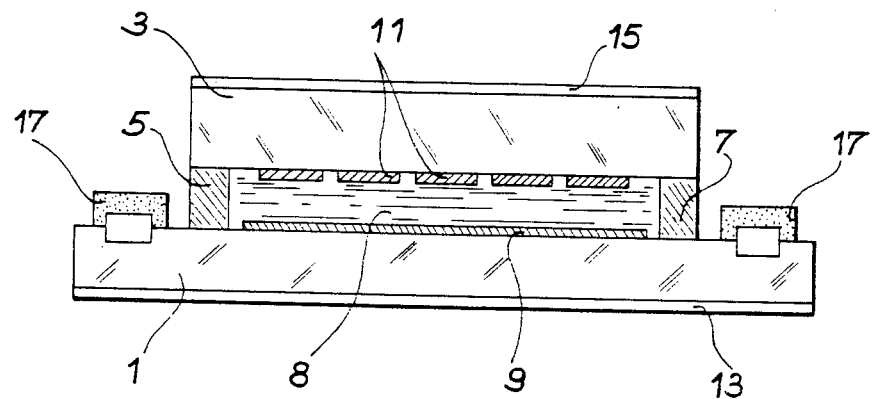

MIXTURES COMPRISING A NEMATIC LIQUID CRYSTAL AND A NON-MESOMORPHIC COMPOUND

BACKGROUND OF THE INVENTION

The present invention relates to a mixture comprising a nematic liquid crystal and a non-mesomorphic compound. More specifically, it relates to a mixture comprising a nematic liquid crystal usable in devices involving the electrically controlled birefringence effect.

In certain liquid crystal devices, the electrooptical effect used is electrically controlled by refringence (ECB). This effect corresponds to a deformation under an electric field of a nematic phase with negative dielectric anistropy $\Delta\epsilon$, the latter representing the difference between the dielectric constant $\epsilon_a$ parallel to the major molecular axis of the crystal and the dielectric constant $\epsilon_b$ perpendicular to said major axis.

In liquid crystal devices, it is necessary to use nematic materials permitting a high multiplexing level, i.e. a large number of electrically addressable screen lines, in order to display a high information level. This multiplexing level k can be expressed as a function of the voltage applied to the terminals of the device (V) and the deformation threshold voltage of the crystal ($V_S$) by the formula:

$$k < \left(\frac{V^2 + V_S^2}{V^2 - V_S^2}\right)^2$$

For a given multiplexing level, it is necessary to have the largest possible molecular tilt angle ($\Phi_M$) in the centre of the liquid crystal cell, in order to obtain the optimum contrast between the two black and white states of the crystal under the action of the electric field. For small tilt angles $\Phi_M$ is directly linked with the deformation threshold voltage of the crystal $V_S$ and the ratio of the bending $K_{33}$ and fanning $K_{11}$ elastic constants of the liquid crystal. Thus, $\Phi_M$ is given by the formula:

$$\Phi_M = \frac{V^2 - V_S^2}{V^2(\frac{2}{3} + \left|\frac{\Delta\epsilon}{\epsilon_a}\right|) - \eta_{31}V_S^2}$$

with $$V_S = 2\pi\sqrt{\frac{\pi K_{33}}{\Delta\epsilon}}$$

$$\Delta\epsilon = \epsilon_a - \epsilon_b$$

$$\eta_{31} = \frac{1 - K_{33}}{K_{11}}$$

Under these conditions, the electrically induced birefringence is then of the form:

$$\Delta n = \left(\frac{\sin^2\Phi}{n_o^2} + \frac{\cos^2\Phi}{n_e^2}\right)^{\frac{1}{2}} - n_0$$

with

-continued
$$\Phi \simeq \Phi_M \cos\frac{\pi}{e}Z$$

in which $n_e$ and $n_o$ are the extraordinary and ordinary indices of the crystal, e the liquid crystal thickness and Z the position of the crystal in the cell.

The relative intensity transmitted by the liquid crystal device between two cross-polarizers is given by the relation:

$$\frac{I}{I_0} = \sin^2\pi\frac{\Delta ne}{\lambda}$$

in which $\Delta n$ is equal to $n_e-n_o$ and $\lambda$ is the wavelength of the light beam illuminating the device. Thus, the most important parameters of the material are ($K_{33}/K_{11}$), $\Delta n$, $\Delta\epsilon$, as well as the crystal mesomorphism range $\Delta T$.

An important function is played by the ratio $K_{33}/K_{11}$, because it determines the steepness of the slope of the electrooptical transfer curve and therefore the multiplexibility of the material used. This ratio must be as large as possible.

As a function of the nematic compounds used, this ratio can vary from 0.5 to 3, the most widely used value being around 1. In order to have a higher value of the ratio $K_{33}/K_{11}$, consideration can be given to increasing the value of $K_{33}$ or decreasing the value of $K_{11}$.

A high value for $K_{33}$ is of no interest in display devices, because it involves the use of high control voltages. Thus, the deformation threshold voltage of the crystal $V_s$ is proportional to the value of the bending elastic constant $K_{33}$ according to formula:

$$V_s = 2\pi\sqrt{\frac{\pi K_{33}}{|\Delta\epsilon|}}$$

It is therefore preferable to decrease the value of $K_{11}$, which corresponds to decreasing the intermolecular interactions between the molecules of the liquid crystal. Generally the nematic liquid crystal molecules are formed from a rigid central part having phenyl groups and one or more flexible parts located at the ends of the rigid part.

Several solutions have been considered for reducing the interactions between the molecules of this type. One of these solutions is to replace a phenyl cycle of the rigid part by a cyclohexane or by a bicyclo-octane nucleus. Thus, the latter nucleus as a result of its substantially globular shape and its completely saturated bonds does not aid intermolecular interactions and this makes it possible to reduce the value of $K_{11}$ and increase the ratio $K_{33}/K_{11}$. A second solution is to substitute one or more hydrogen atoms of the phenyl nucleus by an electronegative element such as fluorine.

However, such modifications suffer from the disadvantage of leading to molecules which do not all have the requisite electrooptical properties for display devices. It is therefore necessary to use them mixed with other liquid crystals, so that there is a significant increase in the value of the $K_{33}/K_{11}$ ratio.

SUMMARY OF THE INVENTION

The present invention relates to a mixture comprising a nematic liquid crystal obviating the aforementioned disadvantage, because it simultaneously has a good elastic behaviour and good electrooptical properties for the display.

The mixture according to the invention comprises at least one nematic liquid crystal and at least one non-mesomorphic compound able to improve the elastic behaviour of the nematic liquid crystal by increasing the value of the ratio $K_{33}/K_{11}$ in which $K_{33}$ represents the elastic bending constant and $K_{11}$ the elastic fanning constant of the liquid crystal.

Thus, it is possible to obtain a mixture comprising a liquid crystal simultaneously having good electrooptical properties and a good elastic behaviour. Thus, it is merely necessary to choose a liquid crystal having the requisite electrooptical parameters for use in a display device and associate it with a non-mesomorphic compound solely modifying the elastic behaviour of the liquid crystal.

In general, the mixture contains at the most 10% and preferably 0.5 to 10% by weight of the non-mesomorphic compound. Thus, the quality of this compound must be small so that, on the one hand, it does not destroy the nematic order of the liquid crystal and, on the other hand, so as not to significantly modify the electrooptical properties of this liquid crystal.

Preferably, the non-mesomorphic compounds used comply with the formula:

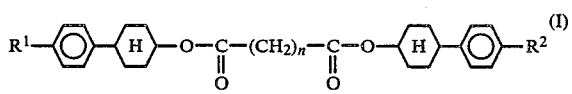
(I)

in which $R^1$ and $R^2$, which can be the same or different, represent a hydrogen atom or an alkyl radical with 1 to 12 carbon atoms and n is an integer between 2 and 16. Examples of such compounds are those according to formula (I) in which n=10 or 14 and $R_1$ and $R_2$, which are identical, represent a hydrogen atom or a radical chosen from among the pentyl, hexyl, heptyl and nonyl radicals.

Preference is given to the use of the compound of formula:

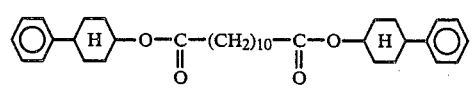
(II)

The non-mesomorphous compounds used in the invention can be prepared by conventional synthesis processes starting from the corresponding phenyl cyclohexanols of formula:

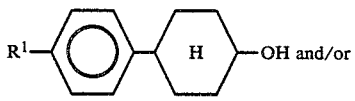

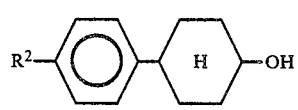

in which $R^1$ and $R^2$ have the meanings given hereinbefore by reacting these phenyl cyclohexanols with the corresponding diacid of formula:

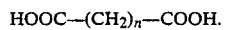

When $R^1$ and/or $R^2$ represent a hydrogen atom, phenyl cyclohexanone constitutes the starting compound and this is reduced into phenyl cyclohexanol by the action of lithium and aluminium hydride $LiAlH_4$ in the presence of ether.

When $R^1$ and/or $R^2$ are alkyl radicals of formula $C_mH_{2m+1}$ with m being an integer between 2 and 11, the corresponding substituted phenyl cyclohexanols are prepared by starting with phenyl cyclohexanol, which is treated with acetic anhydride to obtain the acetic ester of phenyl cyclohexanol of formula:

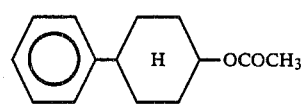

and then this acetic ester of phenyl cyclohexanol is treated with acid chloride of formula $R'^1COCl$ and/or $R'^2COCl$ in which $R'^1$ and $R'^2$ are radicals of formula $C_{m-1}H_{2m}$ with m having the meaning given hereinbefore, to obtain the compound of the following formula:

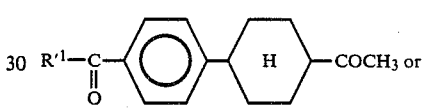 or

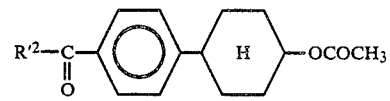

carrying out said reaction in dichloromethane in the presence of aluminium chloride.

The thus obtained compound is then treated with soda to convert it into alkylcarbonyl phenylcyclohexanol of formula:

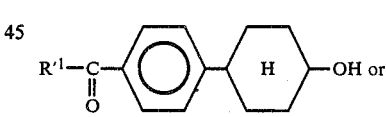 or

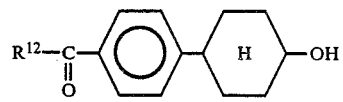

which is then reduced by hydrazine in the presence of diethylene glycol and potash to obtain the corresponding phenyl cyclohexanols of formula:

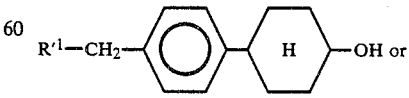 or

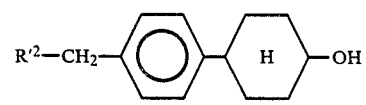

These phenyl cyclohexanols are then reacted with the corresponding diacid by condensing at ambient temperature using the Hassner method in which 1 mole of the diacid, N,N-dicyclohexyl-carbodiimide and 4-pyrrolidinopyrridine in dichloromethane is added to 2 moles of the appropriate phenyl cyclohexanol or phenyl cyclohexanols.

When use is made of two phenyl cyclohexanols of formula:

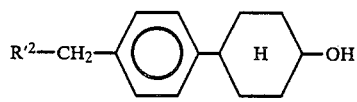

it is necessary to then separate the different compounds present in the reaction mixture in order to isolate the compound of formula (I):

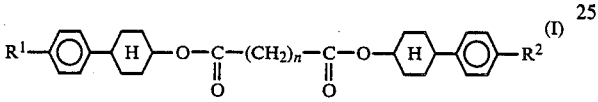

and this can be carried out by conventional methods.

Preferably a single cyclohexanol is used and the compound obtained is a compound of formula (I) in which $R^1$ and $R^2$ are identical.

The non-mesomorphous compounds according to formula (I) can be associated with a liquid crystal preferably having a similar structure, e.g. a liquid crystal constituted by a 1-alkyl-cyclohexyl-2-(alkylfluorobiphenyl)-ethane of formula:

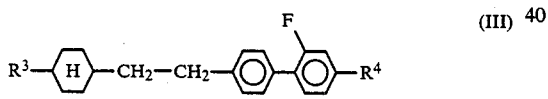

in which $R^3$ and $R^4$, which can be the same or different, are alkyl radicals with 1 to 7 carbon atoms.

It is also possible to associate these non-mesomorphous compounds with mixtures of nematic liquid crystals constituted by at least one 1-(alkylcyclohexyl)-2-(alkylfluorobiphenylyl)ethane of formula:

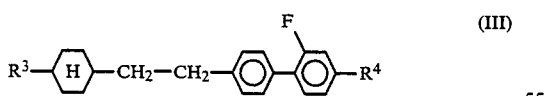

in which $R^3$ and $R^4$, which can be the same or different, are alkyl radicals with 1 to 7 carbon atoms, at least one compound chosen from among:
(a) the alkyl fluorophenyl alkyl by cyclooctane carboxylates of formula:

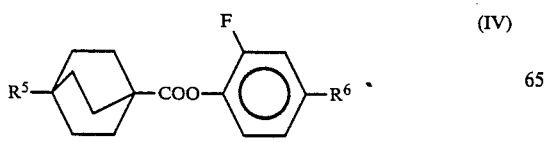

in which $R^5$ and $R^6$, which can be the same or different, are alkyl radicals with 1 to 7 carbon atoms,
(b) biphenylbicyclohexyl dialkyl of formula:

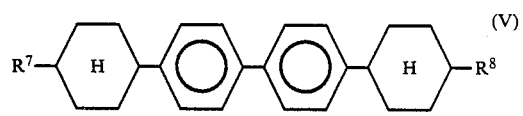

in which $R^7$ and $R^8$ are alkyl radicals with 1 to 7 carbon atoms,
(c) the dicyanoalkoxyphenyl alkylcyclohexyl carboxylates of formula:

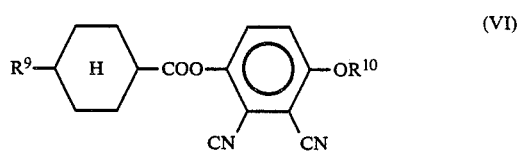

in which $R^9$ and $R^{10}$, which can be the same or different, are alkyl radicals with 1 to 7 carbon atoms and
(d) alkyl alkylene or dialkyl bicyclohexylcarbonitrile of formula:

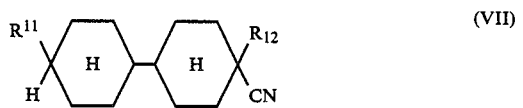

in which $R^{11}$ and $R^{12}$, which can be the same or different, are alkyl or alkylene radicals with 1 to 7 carbon atoms; said mixture comprising:
60 to 90% by weight in all of 1-(alkylcyclohexyl)-2-(alkylfluorobiphenylyl)-ethane,
0 to 15% in all of the alkylfluorophenyl alkyl bicyclooctane carboxylates,
0 to 12% in all of biphenylbicyclohexyl dialkyl,
0 to 12% in all of dicyanoalkoxyphenyl alkyl cyclohexyl carboxylates and
0 to 40% in all of alkyl alkylene or dialkyl bicyclohexylcarbonitrile.

These liquid crystals are known products and can be prepared by conventional processes.

Thus, 1-(alkylcyclohexyl)-2-(alkylfluorobiphenylyl)-ethanes can be prepared by using the method described in British Pat. No. 2 133 795.

Examples of compounds which can be used in the invention are 1-(trans-4-4-n-ethylcyclohexyl)-2-[2'-fluoro-4'-(2-ethyl)-4-biphenylyl]-ethane (I22) of formula:

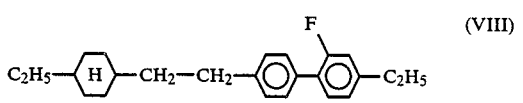

1-(trans-4-n-propylcyclohexyl)-2-[2'-fluoro-4'-(2-pentyl)-4-biphenylyl]-ethane (I35) of formula:

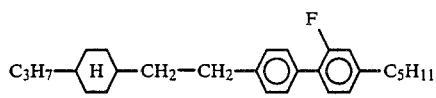 (IX)

1-(trans-4-n-propylcyclohexyl)-2-[2'-fluoro-4'-(2-ethyl)-4-biphenylyl]-ethane (I32) of formula:

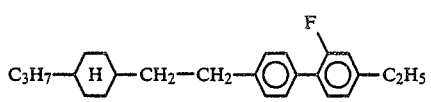 (X)

1-(trans-4-n-pentylcyclohexyl)-2-[2'-fluoro-4'-(2-ethyl)-4-biphenylyl]-ethane (I52) of formula:

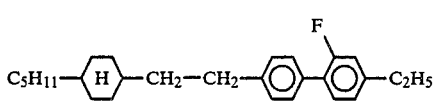 (XI)

The alkylfluorophenyl alkylbicyclooctane carboxylates can be prepared by the method described by G. W. Gray and S. M. Kelly in Mol. Cryst. Liq. Cryst., 1981, vol. 75, pp. 109–119.

Examples of compounds of this type which can be used are 2-fluoro-4-n-pentyl-phenyl-4-n-pentyl-bicyclooctane carboxylate (BC055F) of formula:

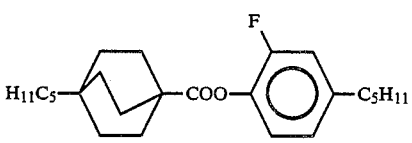 (XII)

and 2-fluoro-4-n-heptylphenyl-4-n-pentyl-bicyclooctane carboxylate (BC057F) of formula:

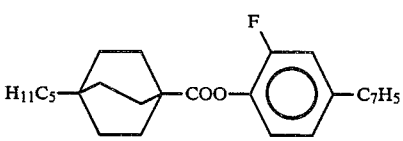 (XIII)

The bicyclohexyl dialkyl biphenyls can be prepared by the method described by R. Eidenschink, E. Erdmann, J. Krause and L. Pohl in Angew Chem., vol. 89, 103, 1977.

Examples of such compounds are 4-(trans-4-n-pentyl-cyclohexyl)-4'-(trans-4-n-propylcyclohexyl)-biphenyl (CBC53) of formula:

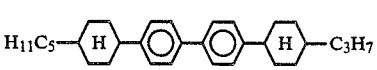 (XIV)

The dicyanoalkoxyphenyl alkylcyclohexyl carboxylates can be prepared by the procedures described by K. Wallenfels, G. Bachmann, D. Hofmann and R. Kern in Tetrahedron, 1965, vol. 21, pp. 2239 to 2256. Compound II on p. 2241 of this article

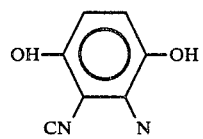

is treated by an acid chloride of a cyclohexyl alkyl

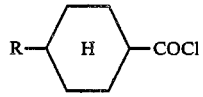

which gives

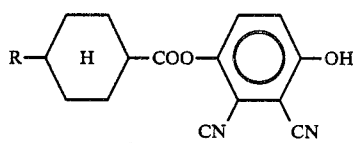

the latter then being treated by an alkyl bromide, which leads to the derivative

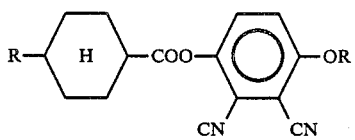

An example of such a compound is 4-n-butoxy-2,3-dicyanophenyltrans-4-n-pentylcyclohexyl-1-carboxylate (5HEN04) of formula:

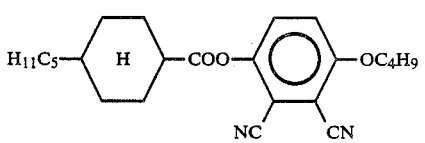 (XV)

The alkyl alkylene or dialkyl bicyclohexylcarbonitriles can be prepared by the method described in R. Eidenschink, G. Haas, M. Romer and B. S. Scheuble in Angew Chem., 96, 1984, no. 2, p. 151.

Examples of such compounds are 4αn-heptyl, 4'αn-butyl-1α,1'αbicyclohexyl-4β-carbonitrile (CCN47) of formula:

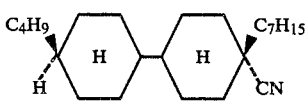 (XVI)

4α,4'αdi-n-pantyl-1α,1'αbicyclohexyl-4β-carbonitrile (CCN55) of formula:

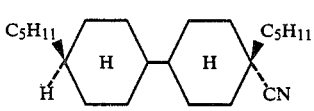 (XVII)

and 4αn-pentyl, 4'α(propenyl-2)-1α,1'αbicyclohexyl-4β-carbonitrile (5CC0d3) of formula:

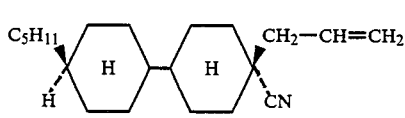
(XVIII)

In general, the mixtures according to the invention contain several constituents and in particular several 1-(alkylcyclohexyl)-2-(alkylfluorobiphenylyl)-ethanes and several constituents chosen from among compounds (a), (b), (c) and (d).

Moreover, when the mixture contains several constituents of the same type, they can be present in the form of eutectic mixtures.

The mixtures according to the invention comprising at least one nematic liquid crystal and at least one non-mesomorphous compound able to improve the elastic behaviour of the nematic liquid crystal by increasing the value of the ratio $K_{33}/K_{11}$ can be used in display devices using the electrically controlled birefringence effect. In this case the screens of such devices are produced using the mixture according to the invention.

DESCRIPTION OF THE DRAWING AND PREFERRED EMBODIMENTS

The invention is described in greater detail hereinafter relative to non-limitative exemplified embodiments of mixtures according to the invention and with reference to the attached drawing, which is a vertical section of a liquid crystal display device using the mixtures according to the invention.

This example illustrates the preparation of a mixture comprising a liquid crystal constituted by 1-(trans-4-n-ethylcyclohexyl)-2-[2'-fluoro-4'-(2-ethyl-4-biphenyl]-ethane (I22) of formula:

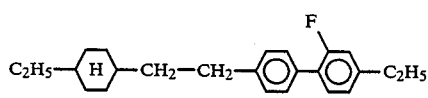
(VIII)

and a non-mesomorphous compound according to formula:

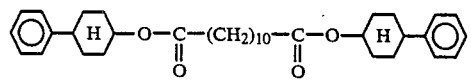
(II)

Firstly the non-mesomorphous compound of formula II is prepared from the phenylcyclohexanol, which is formed by reducing phenylcyclohexanone by lithium and aluminium hydride in the presence of ether. The phenylcyclohexanol is then reacted with the diacid of formula:

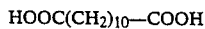
HOOC(CH₂)₁₀—COOH by dissolving in the dichloroethane 1 mole of the diacid, N,N-dicyclohexylcarbodiimide and 4-pyrrolidinopyrridine and said solution is then added to 2 moles of phenylcyclohexanol. This gives the diester of formula (II):

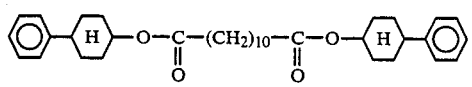
(II)

hereinafter called CVO 35, said product having a melting point of 96° C.

The melting points of the other non-mesomorphic compounds of formula I are given in the following table 1.

TABLE 1

| MELTING POINTS SOLID (K) → ISOTROPIC (I) | | |
|---|---|---|
| n | $R_1 = R_2$ | K → I (°C.) |
| 10 | H | 96 |
|  | $C_5H_{11}$ | 98 |
|  | $C_6H_{13}$ | 102.9 |
|  | $C_7H_{15}$ | 101.6 |
| 14 | $C_5H_{11}$ | 115.1 |
|  | $C_6H_{13}$ | 107.6 |
|  | $C_7H_{15}$ | 105.8 |
|  | $C_9H_{19}$ | 107.2 |

A mixture of this compound is then prepared with liquid crystal I22 of formula (VIII) in order to obtain a mixture containing 4.91% by weight of non-mesomorphous compound CVO 35. The ratio $K_{33}/K_{11}$ of the mixture obtained is then measured by a conventional method. This ratio is 1.72 measured at 25° C., whereas the same measurement performed on liquid crystal I22 alone gives a $K_{33}/K_{11}$ ratio of 1.2.

In the same way, a mixture containing liquid crystal I22 of formula VIII and the non-mesomorphous compound (4.9% by weight) of formula I in which n=10 and $R_1=R_2=C_5H_{11}$ are prepared. In this case, the value of the ratio $K_{33}/K_{11}$ measured at 25° C. is equal to 1.6.

Thus, the addition of the non-mesomorphous compound according to the invention makes it possible to significantly increase the ratio $K_3/K_{11}$.

The mixtures of the invention can be used as a liquid crystal in the display device shown in vertical sectional form in the attached drawing. It can be seen that the display device comprises two insulating, transparent walls 1, 3 and gaskets 5, 7 defining an internal liquid crystal-filled cavity 8. The two insulating walls are internally coated with a cross-band electrode system 9, 11 making it possible to determine the display zones. A cross-polarizer system 13, 15 is located upon either side of walls 1, 3 and a control system 17 makes it possible to apply a voltage to the desired electrodes. In operation, to certain of the electrodes are applied the desired voltages for deforming the liquid crystal in the zones corresponding to these electrodes and in this way obtain the display.

This electrode control device can be of the type described in European Pat. No. 0055966 of the Commissariat a l'Energie Atomique. In this device, it is possible to use the mixtures according to the invention as the liquid crystal.

What is claimed is:

1. A mixture having the properties of a nematic liquid crystal comprising at least one nematic liquid crystal with negative dielectric anisotropy and at least one non-mesomorphic compound able to improve the elastic behaviour of the nematic liquid crystal by increasing the value of the ratio $K_{33}/K_{11}$, in which $K_{33}$ represents the elastic bending constant and $K_{11}$ the elastic fanning constant of the liquid crystal, said non-mesomorphic compound being of formula:

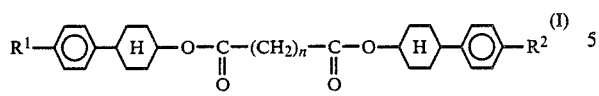

in which $R^1$ and $R^2$, which can be the same or different, represent a hydrogen atom or an alkyl radical having 1 to 12 carbon atoms and n is an integer between 2 and 16, said non-mesomorphic compound comprising 0.5 to 10% by weight of the mixture.

2. A mixture according to claim 1, wherein the non-mesomorphous compound is in accordance with formula:

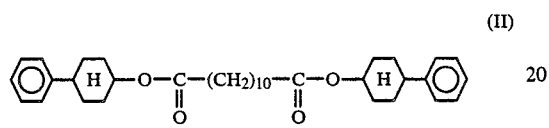

3. A mixture according to claim 1, wherein said at least one nematic liquid crystal is a 1-(alkylcyclohexyl)-2-(alkylfluorobiphenylyl)-ethane of formula:

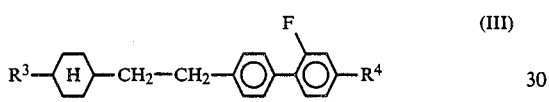

in which $R^3$ and $R^4$, which can be the same or different and are alkyl radicals with 1 to 7 carbon atoms.

4. A mixture according to claim 2, wherein the nematic liquid crystal is 1-(trans-4-n-ethylcyclohexyl)-2-2'-fluoro-4'-(2-ethyl)-4-biphenylyl-ethane of formula:

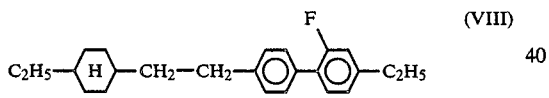

5. A mixture according to claim 1, including a mixture of said liquid crystals comprising at least one 1-(alkylcyclohexyl)-2-(alkylfluorobiphenylyl)-ethane of formula:

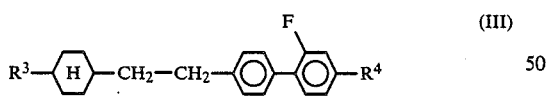

in which $R^3$ and $R^4$, which can be the same or different, are alkyl radicals with 1 to 7 carbon atoms, and at least one compound selected from the group consisting of:
(a) the alkyl fluorophenyl alkyl bicyclooctane carboxylates of formula:

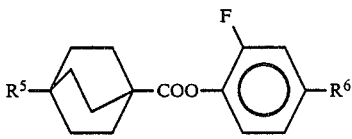

in which $R^5$ and $R^6$, which can be the same or different, are alkyl radicals with 1 to 7 carbon atoms,
(b) biphenylbicyclohexyl dialkyl of formula:

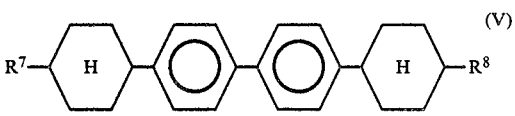

in which $R^7$ and $R^8$ are alkyl radicals with 1 to 7 carbon atoms,
(c) the dicyanoalkoxyphenyl alkylcyclohexyl carboxylates of formula:

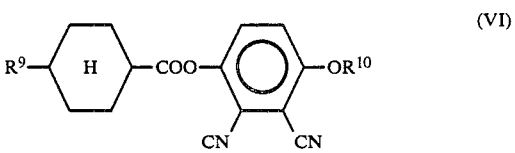

in which $R^9$ and $R^{10}$, which can be the same or different, are alkyl radicals with 1 to 7 carbon atoms, and
(d) alkyl alkylene or dialkyl bicyclohexylcarbonitrile of formula:

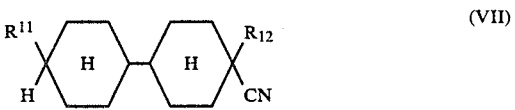

in which $R^{11}$ and $R^{12}$, which can be the same or different, are alkyl or alkylene radicals with 1 to 7 carbon atoms; said mixture comprising:
60 to 90% by weight in all of 1-(alkylcyclohexyl)-2-(alkylfluorobiphenylyl)-ethane,
0 to 15% in all of the alkylfluorophenyl alkyl bicyclooctane carboxylates,
0 to 12% in all of biphenylbicyclohexyl dialkyl,
0 to 12% in all of dicyanoalkoxyphenyl alkyl cyclohexyl carboxylates, and
0 to 40% in all of alkyl alkylene or dialkyl bicyclohexylcarbonitrile.

6. A liquid crystal display device using the electrically controlled birefringence effect, wherein the screen of said device comprises a mixture according to claim 1.

* * * * *